No. 695,564. Patented Mar. 18, 1902.
R. KLEIN.
PHOTOGRAPHIC SHUTTER.
(Application filed May 15, 1900. Renewed Dec. 31, 1900.)
(Model.) 4 Sheets—Sheet 1.
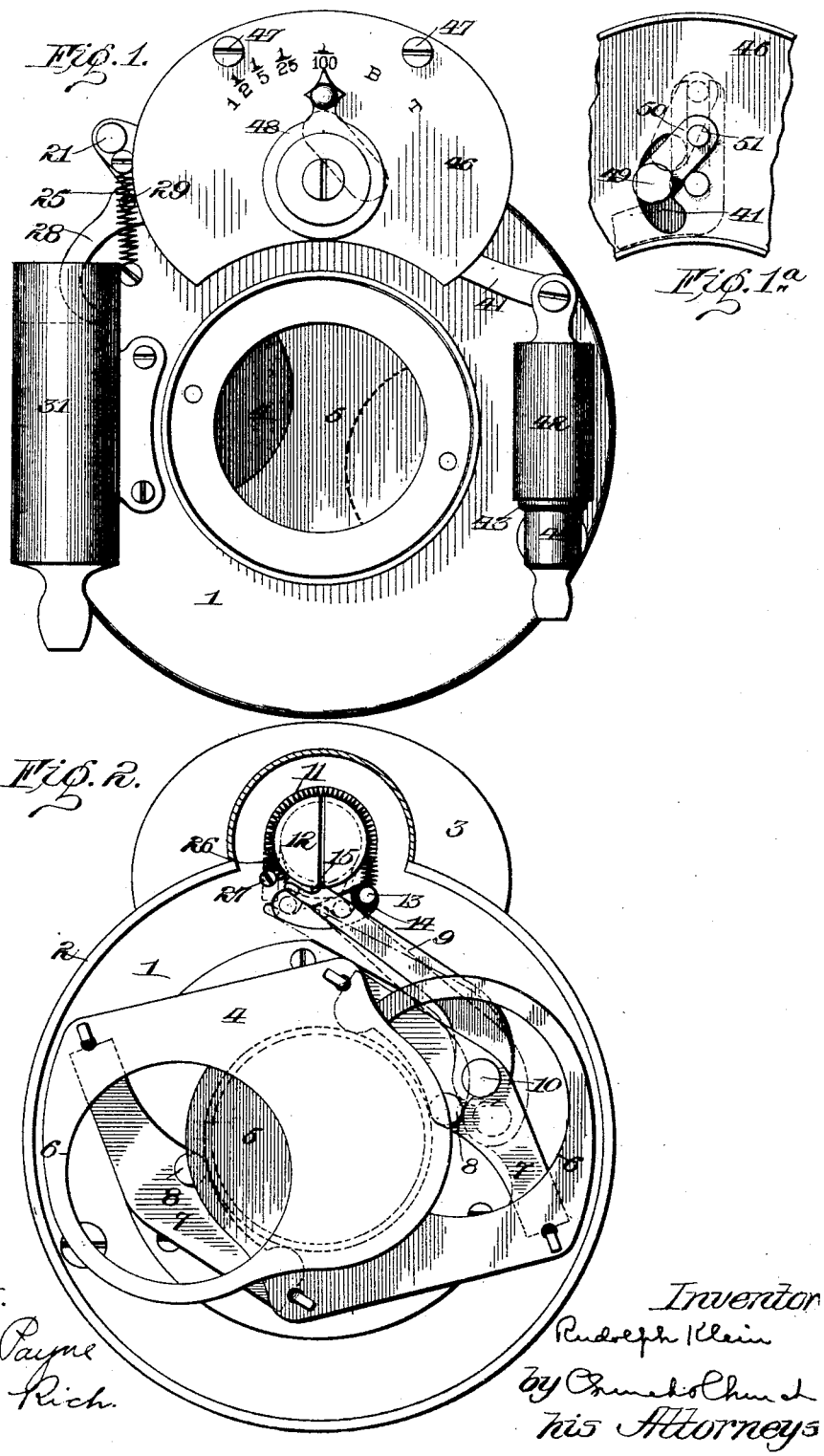
Witnesses.
Walter B. Payne
G. Willard Rich.
Inventor
Rudolph Klein
by Church & Church
his Attorneys

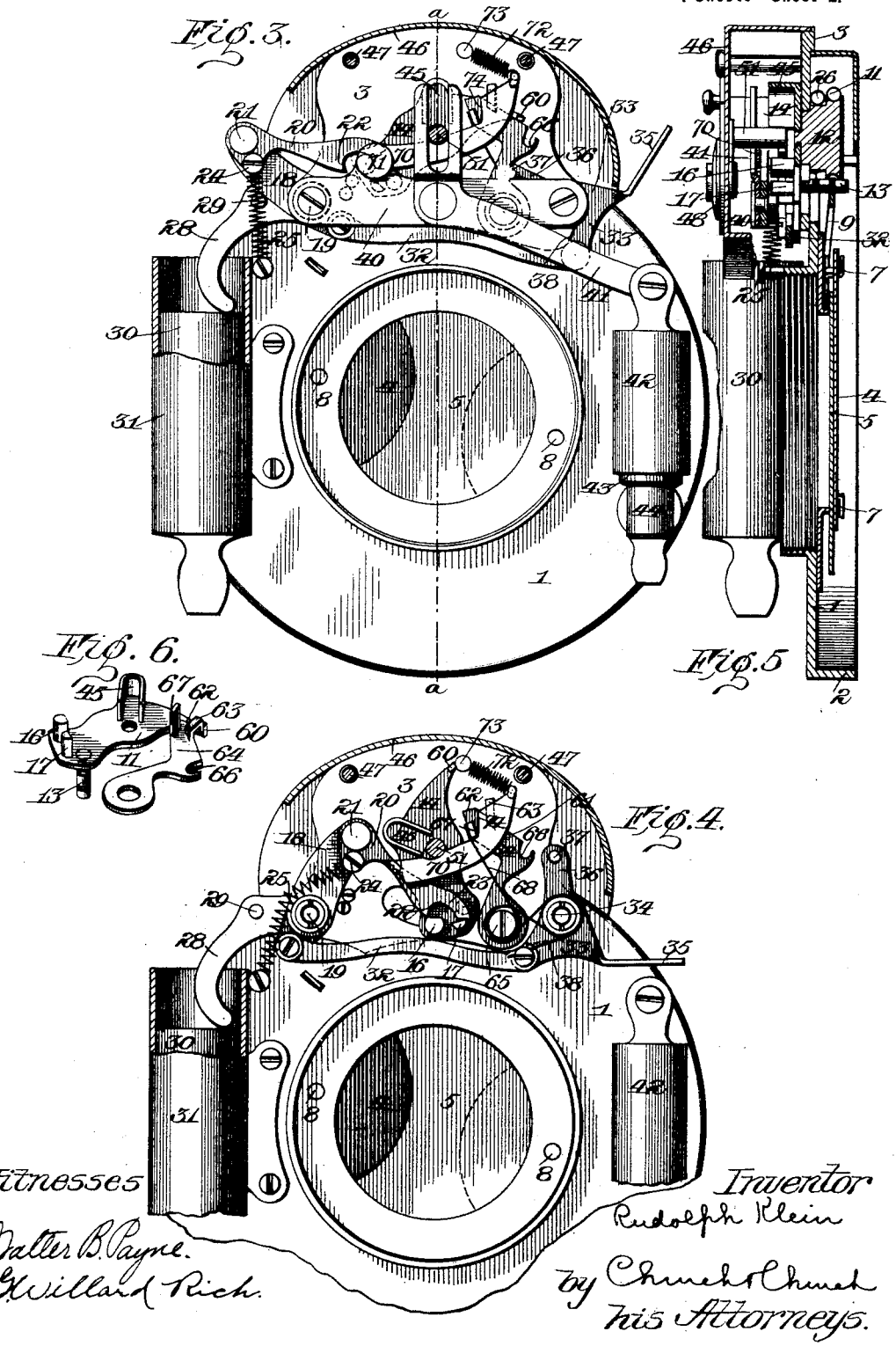

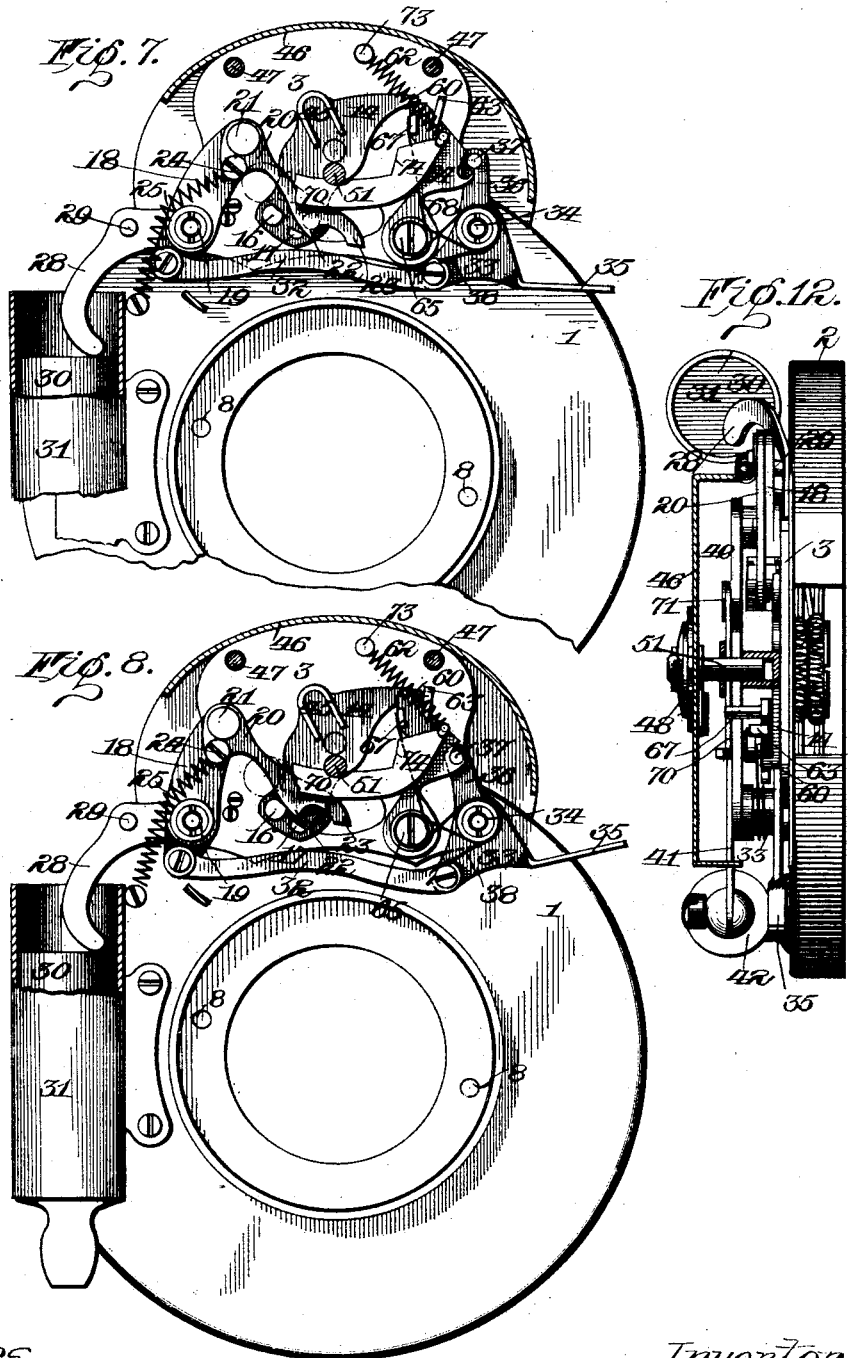

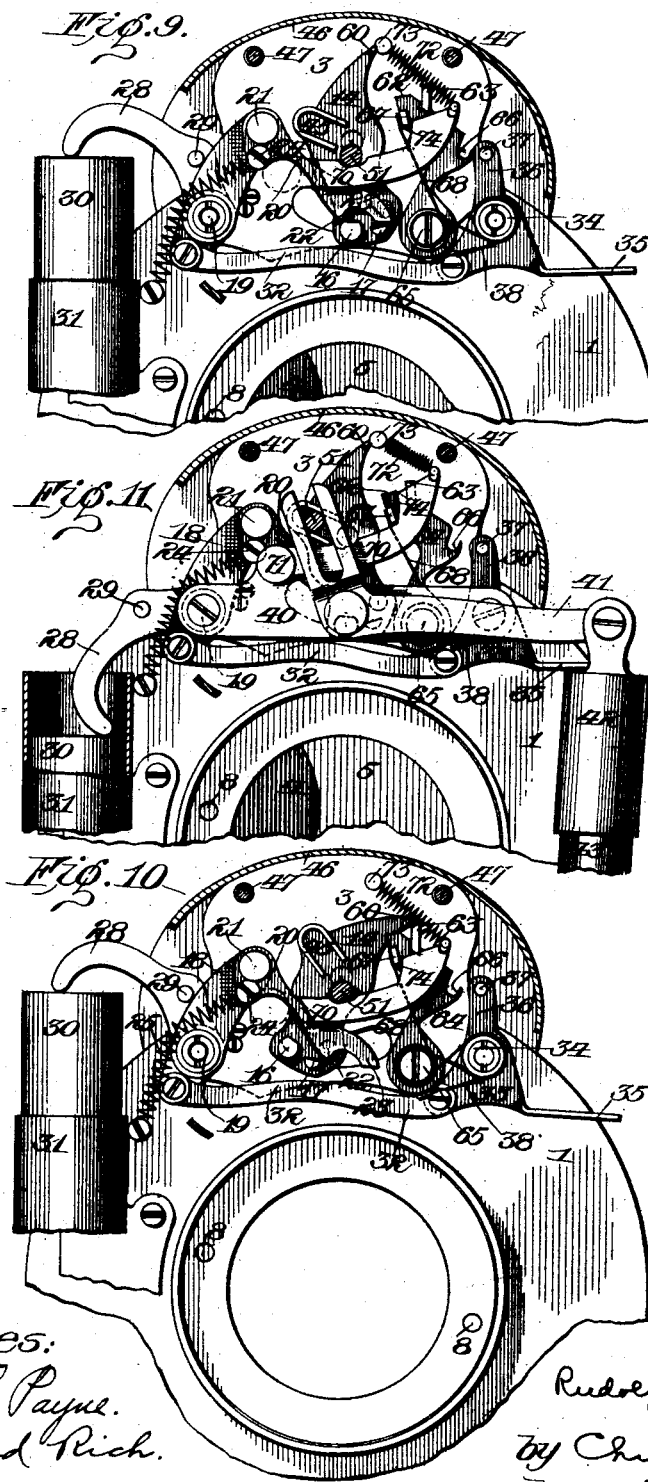

United States Patent Office.

RUDOLPH KLEIN, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 695,564, dated March 18, 1902.

Application filed May 15, 1900. Renewed December 31, 1900. Serial No. 41,732. (Model.)

*To all whom it may concern:*

Be it known that I, RUDOLPH KLEIN, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention has for its object to provide an improved automatic photographic shutter which can be readily set for making instantaneous, time, or so-called "bulb" exposures, and the operation of the shutter caused by the movement of a single part or operating member in one direction, although some of the parts may be readily adapted for use in connection with shutters of a different type; and it consists in certain improvements and combinations of parts, all as will be hereinafter fully described, and the novel features pointed out in the claims at the end of this specification.

In the drawings, Figure 1 is a front view of a shutter constructed in accordance with my invention; Fig. 1ª, a rear view of the front or dial plate with the adjusting or setting devices for determining the kind of exposure to be made; Fig. 2, a rear view of the shutter members and their operating parts looking toward the left in Fig. 5; Fig. 3, a view of the shutter operating and controlling devices with the front plate removed, showing the shutter ready for making an instantaneous exposure; Fig. 4, a similar view just before the parts are tripped, the operation being caused by the movement of the hand-lever; Fig. 5, a vertical sectional view on the line *a a* of Fig. 3; Fig. 6, a detail perspective view of the detaining and master members; Fig. 7, a view similar to Fig. 3, showing the parts set for making a time exposure with the shutter open and before the operating member is released; Fig. 8, a similar view showing the shutter held open ready to be closed by a second operation of the operating member; Fig. 9, a similar view showing the parts set for a bulb exposure just before the shutter is opened; Fig. 10, a similar view showing the parts in position occupied by them when the shutter is held open during a bulb exposure; Fig. 11, a view of the parts set for an automatically-timed exposure; Fig. 12, a plan view.

Similar reference-numerals in the several figures indicate similar parts.

The main casing or support for the shutter embodies a plate 1, having a central aperture and a rearwardly-extending rim 2, to which a cover-plate may be attached, carrying the usual iris diaphragm. Formed with or connected to the upper portion of the main support 1 is a supporting-plate 3, carrying the shutter-actuating parts. The shutter proper—that is to say, the means for intercepting the rays of light—consists in the present instance of two shutter members 4 and 5, (shown particularly in Fig. 2,) each provided with an aperture 6 and pivotally connected at opposite ends to levers 7, pivoted at 8 upon a supporting-plate. One of the levers has a thrust link or arm 9 pivoted to it at 10, the upper free end of which is connected to a coil-spring 11, extending around a disk or boss 12 and connected to a pin 13, projecting from the rear side of a master member or plate 14, rigidly connected to and turning with the disk 12 on the front side of the plate 3. The end of the link 9 is provided with a shoulder 15, adapted to be engaged by the pin 13 when the shutter is set for operation, as shown in dotted lines in Fig. 2, said link turning on the pivot 10 to permit the engagement of the pin with the shoulder, and the connection being such that when the master member moves from the position shown in dot-and-dash lines to that shown in full lines in Fig. 2 the link will be thrust lengthwise to the position shown in dotted lines, moving the apertured shutter members to permit the passage of light, and when the pin 13 reaches the position shown in full lines it will release the link and permit the spring 11 to return it to normal position, closing the shutters again. Thus it will be seen that by reason of the latch connection shown the master member may be moved to the left in Fig. 2 without opening the shutter and when moved to the right will throw the shutter open and permit it to be closed as soon as the pin 13 is disengaged from the link.

While this construction of shutter is particularly adapted to be used in connection with the controlling devices hereinafter described, I do not desire to be confined to this or to any particular type of shutter mechanism, as others can be employed without departing from the spirit of my invention.

The devices for operating and controlling the master member are arranged upon the front of the plate or support 3, and said master member 14 is provided with an engaging pin or projection 16, arranged, preferably, below its pivotal center, and also with a releasing projection 17, in the present instance in proximity thereto, and is operated and released by an operating member embodying the lever 18, pivoted at 19 and carrying a latch or pawl 20, pivoted to the member 18 at 21 and having at its forward end an engaging shoulder or catch 22 and a releasing projection or extension 23. Connected to the latch 20 at 24 is a spring 25, secured at its opposite end to the casing or support and operating to retain the lever 18 in the position shown in full lines and also to hold the pawl 20 down upon the pin or projection 16, the relation of the latch and master member being such that in normal position the latch is adapted to engage the pin 16, as shown in Fig. 3, and when the lever 18 is moved to the position shown in Fig. 3 it will carry the master member around (by the engagement of the projection 22 with the pin) and then the projection 23 on the latch will engage the pin 17 and lift the projection 22 out of engagement with the pin 16, allowing the spring 11 (and also the additional spring 26, extending around the boss 12 and secured to the casing by a screw 27) to operate the master member to first position, thereby opening the shutter proper and permitting closing when the link 9 is disengaged from the pin 13 on the master member.

The movement of the operating lever or arm 18 may be caused by any suitable means—as, for instance, by means of a lever 28, pivoted on the axis of the lever 18, provided with a pin or stud 29, adapted to engage the member when moved in one direction only and having its outer end curved downward and resting upon the top of the piston 30 of a pneumatic engine, having a containing-cylinder 31, supported upon the casing, to which is connected an operating-bulb and tube of the ordinary or any preferred construction. The lower end of the member 18 is connected by a link 32 with one arm of a lever 33, pivoted upon a stud 34 on the support 3, provided with the outwardly-extending thumb-piece or handle 35 and also with the inwardly-extending arm 36, having the pin 37 mounted upon the end thereof. This lever 33 is arranged on the opposite side of the front of the shutter from the pneumatic engine, and by the manipulation of the end 35 the operating member may be moved when it is not desirable to use the pneumatic engine, the connection between the latter and the member 18 being a loose one, as shown. The lever 33 and the member 18 always move together and are practically one structure, so that when in the claims the term "operating member" is used it includes both these parts unless otherwise specified, the present arrangement being employed to make the device as a whole symmetrical and operable from either side. The studs 34, connected to the supporting-plate 3, not only constitute the pivots for the levers, but also carry at their outer end a bridge piece or plate 40, said bridge-piece being shown in Figs. 3, 5, and 11, but omitted in the other figures for the sake of clearness, and pivoted upon the center of this bridge-piece and directly below the pivotal center of the master member is a bell-crank lever 41, carrying at its lower outer end the cylinder 42, coöperating with a cylinder or abutment 43, pivoted at 44 upon the front of the casing, said cylinders forming a dash-pot or retarding device for controlling the timing operations of the shutter and being fitted to each other so that the air will escape from between them but slowly when they are moved relatively together, offering practically a constant resistance to the closing operation of the shutter, as will be described, excepting as the leverage between the master member and said dash-pot is varied. The upper shorter end of the lever 41 is slotted, and upon the master member is arranged a slotted guide formed by a curved rim 45, preferably terminating just above the pivotal center of said member. 46 indicates a face-plate or casing extending over the front of the operating parts of the shutter and secured by the screws 47 or otherwise, said plate having upon its face the figures "1, $\frac{1}{2}$, $\frac{1}{5}$, $\frac{1}{25}$, $\frac{1}{100}$" and the letters "B" and "T," and pivoted upon this plate is a setting member consisting of an arm or index 48, provided at its rear with the crank-pin 49, upon which is pivoted a link 50, carrying at its outer free end a connecting-pin 51, passing through the slotted upper end of the lever 41 and long enough to reach between the sides of the slotted guide 45 on the master member. When the setting arm or index 48 is turned to the numeral "1" on the plate 46, indicating the greatest length of exposure for which the shutter is adapted in the present instance, the pin 51 will be moved upward in the slotted guide 45 at a point farthest removed from the pivotal center of the master member, so that when the master member 14 is moved to the left, as in Fig. 11, in setting it the lever 41 of the retarding device is carried with it and the parts constituting the dash-pot separated, and then when the master member is tripped and is moved backward by its spring the parts of the dash-pot are brought together, and the movement of the master member is retarded by said dash-pot, so as to regulate the speed with which the shutter is tripped to close it, the position of the parts just at the time the master member is tripped and released being shown in Fig. 11. Of course by varying the leverage between the retarding device and the master member the speed with which the latter moves may be regulated, so that exposures of any duration may be accomplished, and thus the indications "$\frac{1}{2}, \frac{1}{5}, \frac{1}{25}$" upon the dial indicate the time that the shutter is open, determined by the amount of leverage between the parts caused by the position of the connecting-pin 51.

In order to cause an instantaneous exposure, it is only necessary to relieve the master member from the operation of the retarding device, which is accomplished when the connecting pin or arm 51 is practically on the center of movement of the master member, as shown in Figs. 3 and 4, when said member is not affected by the retarding device, and the index 48 then coöperates with the indication "$\frac{1}{100}$" on the face-plate, thereby allowing the shutter to close as soon as the operating member is tripped and releasing the master member.

In order to adapt the shutter for time exposures, in which the master member is retained until a second impulse is given to the operating-arm 35 or to the pneumatic operating-engine, or for bulb exposures, when the shutter is held open as long as there is pressure upon the engine or operating-handle, the said master member is provided at its outer end with a stud or projection 60, arranged to coöperate with a point 62 and also with a bulb-stop or projection 63, formed upon a detaining member or arm 64, pivoted upon a stud or screw 65, said detaining member being also provided at its rear side with a hook or projection 66 and at its forward edge with a projection or lug 67. This detaining member is preferably constructed of a single piece of sheet metal struck up in the proper form, as shown in Fig. 6, and is moved outwardly away from the pivotal point of the master member by a spring 68, extending around the stud 63 and having its ends engaging the stud or bridge-support 34. Also extending around the stud 34 is a light spring 38, having one end engaging the stud 65 and the other operating upon the handpiece or lever 33 for assisting in turning the latter to the position shown in Fig. 3 and insuring the operation of a catch thereon, notwithstanding the relatively loose connection with the member or lever 18.

70 indicates an arm controlling member or lever, pivoted at 71 to the bridge-piece 40, extending across the center of the master member and having its outer end connected to a spring 72, attached to the main frame at 73, said spring serving to normally hold the arm up in the position shown in Figs. 3 and 11, so that an inclined shoulder 74 on said controller will coöperate with the projection 67 on the detaining member and preventing the outward movement of the latter to the position shown in Figs. 7 to 10. The position of this controller determines the operation of the shutter for bulb or time exposures and is itself operated against the tension of the spring 72 by means of the pin 51 of the setting member, which extends above it. Thus when it is desired to make a time exposure the index 48 of the setting member is moved to coöperate with the letter "T" on the front plate, thereby moving the pin 51 down to the position shown in Figs. 7 and 8, removing the time-controlling member 70, with its projection or shoulder 74, out of the path of the stop or projection 67 on the detaining member. When now the operating member 18 is moved either by the bulb or the handpiece 35, the master member will be operated to open the shutter-leaves, and as soon as the pin 37 on the lever 33 moves out from beneath the projection 66 on the detaining member the spring 68 will throw the latter back to the position shown in full lines in Fig. 7, with the point or end 62 in the path of the stop or projection 60 on said master member and the hook 66 beneath the pin 37 on lever 33, and when the master member is released from the operating member its operating-spring will throw it down, and it will be arrested by the engagement of stops 60 and 62, as shown in Fig. 7, with the shutters maintained open. When the pressure upon the operating member is released, the pin 37 upon the lever 33 will engage the hook or projection 66 on the detaining member, moving the latter forward slightly, far enough to take the end of the projection or bulb-stop 62 out of the path of the stop 60 on the master member; but the outer inclined surface 61 of the member 64 will engage the stop 60, and being on a different curve or plane from that of the path of the latter and the member 64 still engaged by the pin 37 the shutter will be held open, the parts being then in the position shown in Fig. 8, and upon a second operation of the controlling member the projections 37 and 66 will be disengaged, allowing the master member to move to first position, closing the shutter again.

When it is desired to cause a bulb exposure, it is necessary to move the index 48 of the setting member to coöperate with the letter "B" on the face or index plate, thereby moving the controller 70 only far enough to permit the detaining member to move on its pivot outwardly far enough to bring the projection 63 in the path of the projection 60 on the master member, so that after the latter moves a sufficient distance to throw the shutter open it is retained by the projection 63, as shown in Fig. 10, as long as pressure is maintained on the operating member or its lever 33, and as soon as this pressure is relieved the lever is moved forward by its spring, and the pin 37 engages the rear side of the projection 66 on the detaining member, moving the latter forward and releasing the stop 63 from 60, allowing the master member to move to close the shutter again.

From the above description it will be understood that the shutter is adapted for making instantaneous, time, automatically-controlled time, and bulb exposures by the simple manipulation of the operating member, the shutter being set in the first instance for the kind of exposure required and returning to normal position after the exposure has been made, ready for a second operation of the same kind, if desired, or the kind of exposure may be changed by the manipulation of the index 48 of the setting member.

While I prefer the particular form of shutter shown, embodying two reciprocating overlapping leaves or shutter members, I do not desire to be confined to this, as other forms could be used, and also, although I prefer to actuate the shutter by means of both the bulb and the operating-lever 33, capable of manipulation by hand, I do not desire to be confined to either of these arrangements.

The term "master member" is used herein in the broad sense of a device having a connection with the shutter proper and controlling its operation.

By arranging the operating parts on the base or supporting plate of the shutter the engine and retarding devices on opposite sides I am enabled to render the shutter symmetrical and by placing the setting devices upon the removable cover-plate, with a detachable connection between them and the operating parts, ready access is had to the parts for the purpose of inspection or repair when desired.

The division of the operating member into two parts—i. e., the levers 18 and 23—also contributes to the symmetrical arrangement and balances the shutter more evenly than if they were arranged on the same side of the master member.

I claim as my invention—

1. In a photographic shutter, the combination with a shutter proper, a spring-operated master member and a movable operating member for operating the master member against its spring and releasing it by a continued movement in one direction, of a single detaining member having time and bulb stops adapted to coöperate separately with the master member, and means for holding said member with both stops out of engagement with the master member.

2. In a photographic shutter, the combination with a shutter proper, a spring-operated master member and a movable operating member for operating the master member against its spring and releasing it, of a single detaining member having time and bulb stops either of which may coöperate with and control the movement of the master member, and a setting device for controlling the position of the detaining member.

3. In a photographic shutter, the combination with a master member, of a single detaining member having time and bulb stops, either of which may coöperate with and control the movement of the master member, a setting device for controlling the position of the detaining member, and an operating member for actuating the master member and engaging and controlling the detaining member.

4. In a photographic shutter, the combination with a master member, of a single detaining member having time and bulb stops, either of which may coöperate with and control the movement of the master member, a setting device for adjusting the detaining member to cause one stop to engage the master member, an operating member coöperating with the master member to actuate it when moved in one direction and coöperating with the detaining member to release the master member when operated in the other direction.

5. In a photographic shutter, the combination with a master member, of a single detaining member having time and bulb stops, either of which may coöperate with and control the movement of the master member, a setting device for adjusting the detaining member to cause one stop to engage the master member, an operating member coöperating with the master member to actuate it when moved in one direction and coöperating with the detaining member to hold it, said master member coöperating with and operating the detaining member to normal position when the latter is released by the operating member.

6. In a photographic shutter, the combination with a master member, of a single detaining member having time and bulb stops, either of which may coöperate with and control the movement of the master member, a setting device for adjusting the detaining member to cause either stop to engage the master member, an operating member for actuating the master member in one direction and coöperating with the detaining member to hold the latter in engagement with the master member.

7. In a photographic shutter, the combination with a master member, of a single detaining member having two time-stops adapted to be engaged successively by the master member to arrest the latter, and a movable operating member for actuating the master member in one direction and coöperating with the detaining member to hold the second stop on the latter in engagement with the master member.

8. In a photographic shutter, the combination with a master member, of a single detaining member having two time-stops adapted to be engaged successively by the master member for a time exposure, and a stop adapted to be engaged for a bulb exposure, an operating member for operating the master member in one direction and coöperating with the detaining member, and setting devices for controlling the position of the detaining member.

9. In a photographic shutter, the combination with the master member, of a single movable detaining member having stops thereon coöperating with the master member for time and bulb exposures, means for controlling the position of the detaining member to bring either set of stops into position to engage the master member, and an operating member operating to move the master member in one direction and coöperating with the detaining member.

10. In a photographic shutter, the combination with the master member, of a single movable detaining member having three stops thereon, two adapted to coöperate in succession with the master member for time exposures and one for bulb exposures, setting devices for bringing the time or bulb stops into coöperative relation with the master member, and an operating member adapted to actuate the master member in one direction and coöperating with the detaining member to control it.

11. The combination with the master member, of the detaining member having the stop 62 and incline 61, and the operating member for actuating the master member and coöperating with the detaining member when the incline 61 is in engagement with the master member.

12. The combination with the master member having the stop or projection thereon, the detaining member having the stop 62 and incline 61, and the spring for operating it with the stop 62 in the path of the stop on the master-lever, of the catch 33 engaging the detaining member to move it against its spring and then arrest it with the stop 62 engaging the incline.

13. The combination with the master member having the stop 60, of the movable detaining member having the stop 62, incline 61 and the stop 63 thereon, setting devices for controlling the movement of the detaining member, and means for operating and releasing the detaining member.

14. In a photographic shutter, the combination with the master member, the operating member coöperating therewith, of the detaining member having the stops 62 and 63 and the incline 61, the spring for operating the detaining member, setting devices for limiting the movement of the detaining member, and connections between the operating member and the detaining member for moving the latter against its spring and for holding it.

15. The combination with the master member, the detaining member having the stops 62 and 63, the incline 61, and catch 66, and the spring for operating the member, of devices for controlling the movement of the detaining member, and the lever 33 having the catch 37 thereon.

16. The combination with a shutter, a movable projection or member, of a pivoted detaining member having time-stops and a bulb-stop adapted to coöperate with said projection and control its movement, means for controlling the movement of the detaining member on its pivot to bring either set of stops into position to engage the projection, and means for operating said member on its pivot to cause the successive release of the time-stops when in operative relation with the projection and to cause the release of the bulb-stop when the latter is in coöperative relation therewith.

17. In a photographic shutter, the combination with a master member, an operating member for actuating it in one direction, and detaining devices for the master member controlled by the operating member, of a retarding device for governing the movement of the master member and detachably connected thereto.

18. In a photographic shutter, the combination with a master member, an operating member for actuating it in one direction, and detaining devices for the master member controlled by the operating member, of a retarding device for governing the movement of the master member, adjustably and detachably connected thereto, whereby the speed of movement of the master member may be governed.

19. In a photographic shutter, the combination with a master member, an operating member for actuating it in one direction, and detaining devices for the master member controlled by the operating member, of a retarding device of constant force, and adjustable connections between said device and the master member for varying the leverage between the parts to change the speed of operation.

20. In a photographic shutter, the combination with a spring-operated master member, an operating member for actuating and releasing it by a continued movement in one direction, of a retarding device of constant force, and an adjustable connection between said device and the master member, whereby the speed of operation of the latter may be varied.

21. The combination with a spring-actuated shutter proper, a master member, a latch connection between it and the shutter, an operating member, a spring for operating it in one direction, and a latch connection between the operating member and the master member, of a retarding device, and adjustable connections between it and the master member for controlling the latter.

22. The combination with a shutter proper, a master member for opening and closing the shutter by a movement in one direction, an operating member for moving the master member to operate the shutter, and means for returning the member to first or normal position, of a retarding device for regulating the speed of the master member.

23. The combination with a shutter proper, a master member for opening and closing the shutter by a movement in one direction, an operating device for setting the master member to operate the shutter, and means for automatically returning it to normal position, of an adjustable retarding device for retarding the movement of the master member in a direction to cause the closing of the shutter.

24. The combination with a shutter proper, a master member for opening and closing the shutter by a movement in one direction, an operating device for setting the master member to operate the shutter, and means for automatically returning it to normal position, of a retarding device of constant force, and an adjustable connection between it and the master member for varying the leverage between the retarding device and master member.

25. The combination with a shutter proper, a spring for closing it, a master member, a spring for operating it in a direction to open the shutter, a latch connection between said member and the shutter, an operating member, a latch connection between it and the master member, and a spring for returning the operating member, of an adjustable retarding device connected to the master member for retarding the movement of the latter when operated by its spring.

26. The combination with a shutter proper, a spring for closing it, a master member, a spring for operating it in a direction to open the shutter, a latch connection between the said member and the shutter, an operating member, a latch connection between it and the master member, and a spring for returning the operating member, of a retarding device of constant force, and an adjustable connection between it and the master member for changing the leverage between them.

27. The combination with a shutter proper, a spring for closing it, a master member, a spring for operating it in a direction to open the shutter, a latch connection between said member and the shutter, an operating member, a latch connection between it and the master member, and a spring for returning the operating member, of detaining devices coöperating with the master member, and operated by the operating member, a retarding device coöperating with the master member and a setting device operating to control the detaining devices and the relation of the master member and retarding device.

28. The combination with a shutter, a master member for operating it, and an operating member having a latch connection with the master member, of adjustable time-stops for arresting the master member operated by the operating member, a retarding device for governing the operation of the master member, and a setting device controlling the relation of the time-stops to the master member and also the connection of the retarding device therewith.

29. The combination with a shutter, a master member for operating it, an operating member having a latch connection with the master member, of two time-stops and a bulb-stop for coöperating with the master member and operated by the operating member, a retarding device, and a movable setting device for controlling the relation of the stops and master member and also adjusting the master member and the retarding device relatively to vary the movement of the former.

30. In a shutter, the combination with the pivoted master member having the engaging and releasing projections thereon, of the lever 18 having the pivoted latch provided with a shoulder engaging the projection on the master member, and the extension engaging the releasing projection, and the spring engaging the pivoted arm and operating it and the lever 18 in one direction.

31. In a shutter, the combination with the spring-operated master member, of the lever 18, the pivoted latch thereon coöperating with the master member to move it in one direction, the lever 33 connected to the lever 18, detaining devices coöperating with the master member and operated upon by the lever 33.

32. In a shutter, the combination with the spring-operated master member having the stop thereon, of the lever 18, a latch connection between it and the master member, the lever 33 connected to the lever 18, and the detaining member having stops engaging the master member and operated upon and detained by the lever 33.

33. In a photographic shutter, the combination with the shutter proper, a master member for operating it, of a movable operating member coöperating with the master member to actuate it in one direction, a single detaining member having a plurality of stops thereon adapted to coöperate separately with the master member, and a detachable connection between the detaining and operating members.

34. In a photographic shutter, the combination with the shutter proper, and a master member for operating it, of a movable operating member coöperating with the master member to actuate it in one direction, a single detaining member having a plurality of stops thereon adapted to coöperate separately with the master member and actuated by the operating member, and means for controlling the position of the detaining member and the relation of its stops with the master member.

35. In a photographic shutter having mechanism adapted for instantaneous, time and bulb exposures, of an automatic timing device for regulating the length of the exposure, a setting device for operating the time and bulb exposure devices into and out of coöperative relation with the shutter mechanism and varying the operation of the timing device, and an operating member automatically movable in one direction and manually operable to cause the actuation of the shutter and to control it when set for time or bulb exposures.

36. The combination with the shutter proper, the master member, and the single detaining member having the bulb and time stops thereon, of the controlling-lever coöperating with the detaining member, the retarding device having the slotted lever, and the movable setting device coöperating with the master member and the retarding device and with the controlling-lever.

37. In a shutter, the combination with the pivoted master member having the engaging and releasing projections, of the pivoted lever 18, the pivoted latch thereon having the shoulder engaging the projection on the master member, and the extension engaging the releasing projection.

38. In a photographic shutter, the combination with a master member, an operating member for actuating it in one direction, movable and adjustable detaining devices for the master member for making bulb and time exposures and controlled by the operating member, of a retarding device for governing the movement of the master member, and setting devices coöperating with the detaining devices and with the retarding device for varying their relation to the master member.

39. In a photographic shutter, the combination with a master member, an operating member for actuating it in one direction and releasing it, movable and adjustable detaining devices for the master member for time and bulb exposures and controlled by the operating member, of a retarding device for governing the movement of the master member and a single movable part for controlling the detaining and retarding devices to vary their relations with the master member.

RUDOLPH KLEIN.

Witnesses:
F. F. CHURCH,
THEODOR BRUECK.